(12) United States Patent
Li et al.

(10) Patent No.: US 7,549,444 B2
(45) Date of Patent: Jun. 23, 2009

(54) FROST FREE VALVE ASSEMBLY

(75) Inventors: James Li, Brownsburg, IN (US); Peter Berkman, Highland Park, IL (US)

(73) Assignee: B & K Industries, Inc., Elk Grove Village, IL (US)

( * ) Notice: Subject to any disclaimer, the term of this patent is extended or adjusted under 35 U.S.C. 154(b) by 0 days.

(21) Appl. No.: 11/315,679

(22) Filed: Dec. 22, 2005

(65) Prior Publication Data

US 2006/0157124 A1 Jul. 20, 2006

Related U.S. Application Data

(63) Continuation-in-part of application No. 11/049,218, filed on Feb. 2, 2005, now Pat. No. 7,140,390, which is a continuation-in-part of application No. 10/631,372, filed on Jul. 31, 2003, now Pat. No. 6,880,573.

(51) Int. Cl.
*F16K 1/30* (2006.01)
*F16K 15/18* (2006.01)

(52) U.S. Cl. .................. 137/614.2; 137/454.6; 137/360

(58) Field of Classification Search .............. 137/454.5, 137/454.6, 614.2, 301, 302, 360
See application file for complete search history.

(56) References Cited

U.S. PATENT DOCUMENTS 5,143,349 A * 9/1992 Korfgen et al. .............. 251/314
5,392,805 A * 2/1995 Chrysler ...................... 137/360
5,996,614 A * 12/1999 Ashton ...................... 137/454.6
6,929,029 B1 * 8/2005 Chung ....................... 137/614.2
7,140,390 B2 * 11/2006 Berkman et al. ......... 137/614.2
2005/0161087 A1 * 7/2005 Brattoli et al. .............. 137/360

* cited by examiner

*Primary Examiner*—Kevin L Lee
(74) *Attorney, Agent, or Firm*—Harness, Dickey & Pierce, P.L.C.

(57) ABSTRACT

A frost free faucet having a spigot assembly including a drain conduit, a sleeve assembly including an elongated pipe, and a valve assembly. The valve assembly includes a ½ turn valve, a check valve and optionally a pressure relief mechanism. The ½ turn valve includes a rotatable valve element configured with a water passageway and a stationary valve element with one or through holes. The rotatable valve element is circular-shaped and configured with a water passageway in a semicircular portion. The stationary element is a disc shaped configured with one or more through-holes in a semi-circular portion of the stationary valve element. Upon turning the rotatable valve element 180 degrees in a first direction, the water passageway and the one or more through-holes are aligned to an open position and upon turning the rotatable element 180 degrees in a second direction, the water passageway and the one or more through-holes are misaligned to a closed position. Each valve element of the ½ turn valve may be formed from a ceramic material. The check valve is located upstream of the ½ turn valve to prevent the backflow of water from the spigot to the supply line. An optional pressure relief mechanism allows water trapped downstream of the valve assembly to be discharged from the valve assembly.

15 Claims, 13 Drawing Sheets

US 7,549,444 B2

FROST FREE VALVE ASSEMBLY

CROSS-REFERENCE TO RELATED APPLICATIONS

This application is a continuation-in-part of U.S. patent application Ser. No. 11/049,218, filed Feb. 2, 2005, now U.S. Pat. No. 7,140,390, which, in turn, is a continuation-in-part of U.S. patent application Ser. No. 10/631,372, filed on Jul. 31, 2003 now U.S. Pat. No. 6,880,573. The disclosures of the above identified applications are incorporated herein by reference.

BACKGROUND OF THE INVENTION

1. Field of the Invention

The present invention relates to a valve assembly for use in residential or commercial plumbing systems and more particularly to a ½ turn frost free valve assembly.

2. Description of the Prior Art

Frost free faucets have long been in existence. These faucets characteristically have a shut-off valve located in the end of an elongated pipe or sleeve located within the wall or a warmer interior area of the building of which the wall is a part. This shut-off valve is operated by an elongated rod connected to an exterior handle. The frost free characteristics of the faucet are caused by the shut-off valve shutting off the flow of water at a point within the wall or building with the residual water in the elongated pipe flowing by gravity outwardly through the conventional outlet drain of the faucet. In this manner, the valve may be used in sub-freezing climates without requiring seasonal draining.

Conventional frost free faucets, however, utilize a valve design that is subject to deterioration during the lifetime of the faucet due to water impurities. The deterioration of the valve subjects the frost free faucet to backflow and leaks, which are undesirable. Furthermore, these conventional valve designs require multi-turn operation and therefore are tiresome to operate.

It is desirable, therefore, to provide a frost free faucet that has an improved valve design. More particularly, it is desirable to provide a simple yet sophisticated valve design that enable an increased longevity, while maintaining sufficient backflow prevention. Furthermore, it is desirable to provide a valve design that allows ease of use.

SUMMARY OF THE INVENTION

A ½ turn frost free valve includes a ½ turn valve cartridge assembly, a check valve and optionally a pressure relief mechanism. The ½ turn valve cartridge includes a rotatable valve element and a stationary valve element. The rotatable valve element is circular-shaped and configured with a water passageway in a semicircular portion. The stationary element is disc shaped configured with one or more through-holes in a semi-circular portion. Upon turning the rotatable valve element 180 degrees in a first direction, the water passageway and the one or more through-holes are aligned to an open position and upon turning the rotatable element 180 degrees in a second direction, the water passageway and the one or more through-holes are misaligned to a closed position. Each valve element of the ½ turn valve may be formed from a ceramic material. A check valve is located upstream of the ½ turn valve to prevent the backflow of water from the spigot to the supply line. An optional pressure relief mechanism allows water trapped downstream of the valve assembly to be discharged from the valve assembly.

DESCRIPTION OF THE DRAWING

The present invention will become more fully understood from the detailed description and the accompanying drawings, wherein.

DETAILED DESCRIPTION OF THE INVENTION

The present invention relates to a frost free valve. FIGS. 1-11 illustrate a ¼ turn frost free valve. FIGS. 12-16 illustrate a ½ turn valve.

¼ Turn Valve

Figure 1:
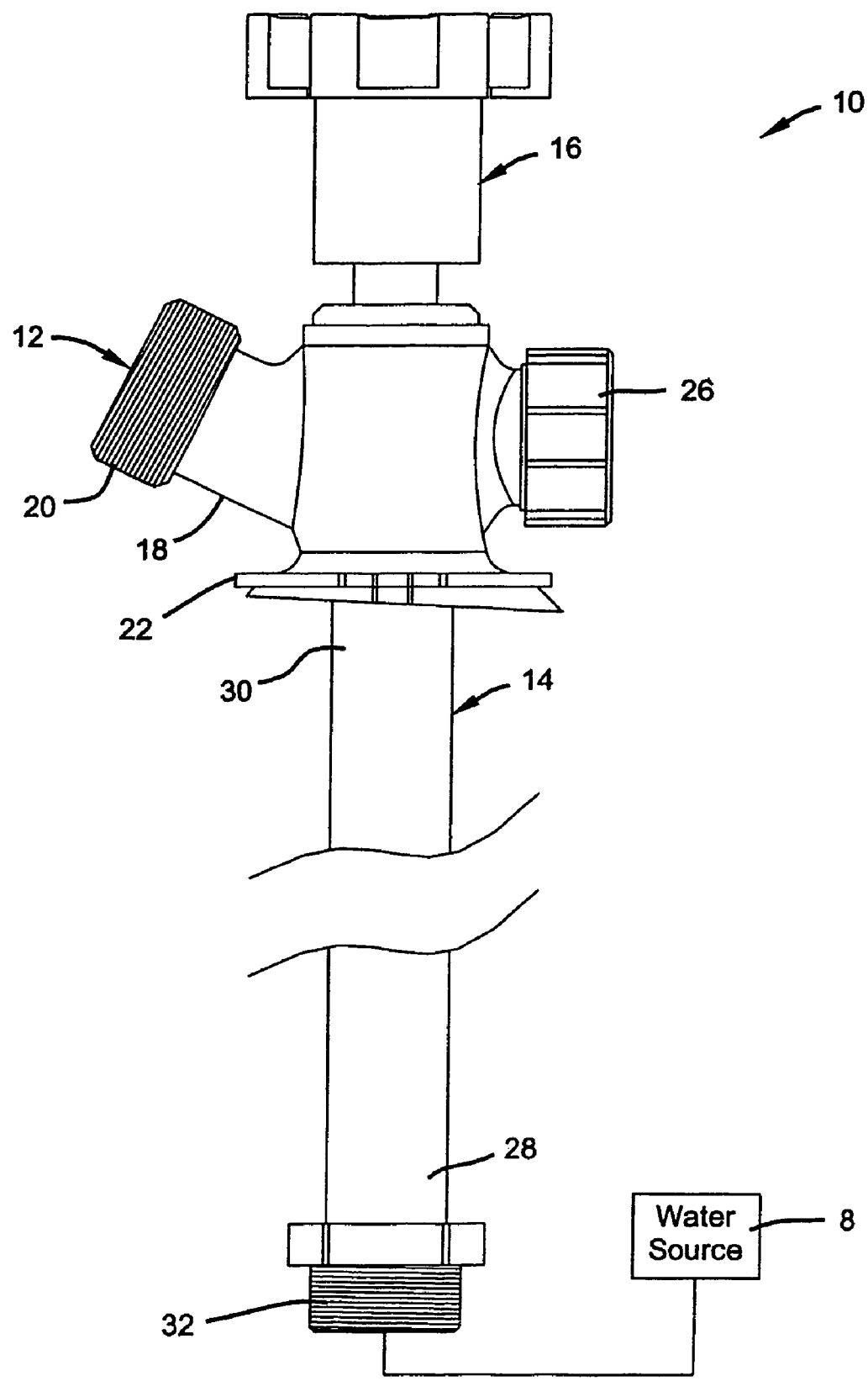
FIG. 1 is a side view of a ¼ turn frost free faucet assembly.

With reference to FIG. 1, the frost free faucet 10 includes a sill-cock or spigot assembly 12 coupled to a sleeve assembly 14. The spigot assembly 12 is further coupled to a handle assembly 16. The spigot assembly 12 is a hollow, monolithic structure that is preferably cast of stainless steel, chrome-plated brass or any other material known to one skilled in the art that is durable and can withstand extreme weather conditions. The spigot assembly 12 includes a drain conduit 18 with a threaded portion 20 for receiving a hose or any other device one may desire to attach to the frost free faucet assembly 10. The spigot assembly 12 also includes a flange member 22. The flange member 22 is used to secure the spigot assembly 12 to a wall or other barrier to which the frost free faucet assembly 10 is attached. Furthermore, the spigot assembly 12 includes a poppet housing 24 (FIG. 2) covered by a threaded cap 26. The poppet housing 24 encloses a poppet assembly 25 and o-ring 27 that function as a vacuum breaker.

The sleeve assembly 14 is a hollow pipe having an upstream portion 28 and a downstream portion 30. The downstream portion 30 is in fluid communication with the spigot assembly 12 and is secured to the spigot assembly 12 by welding, soldering, sweating, brazing, or the like. The upstream portion 28 includes threaded portion 32 so that the frost free faucet assembly can be connected to a water source 8, by way of an inlet pipe (not shown) located within a structure such as a building. Alternatively, the upstream portion 28 may be adapted to fluidly couple to the inlet pipe by other conventional means.

The sleeve assembly 14 is preferably 4 to 14 inches in length. It should be understood, however, that the sleeve assembly 14 can be any length so long as a valve cartridge assembly 42 (shown in FIG. 2), located within the upstream 28 portion of the sleeve assembly 14, is located within the wall or barrier of the dwelling so that the valve cartridge assembly 42 is subjected to warmer temperatures so as not to freeze.

Figure 2:
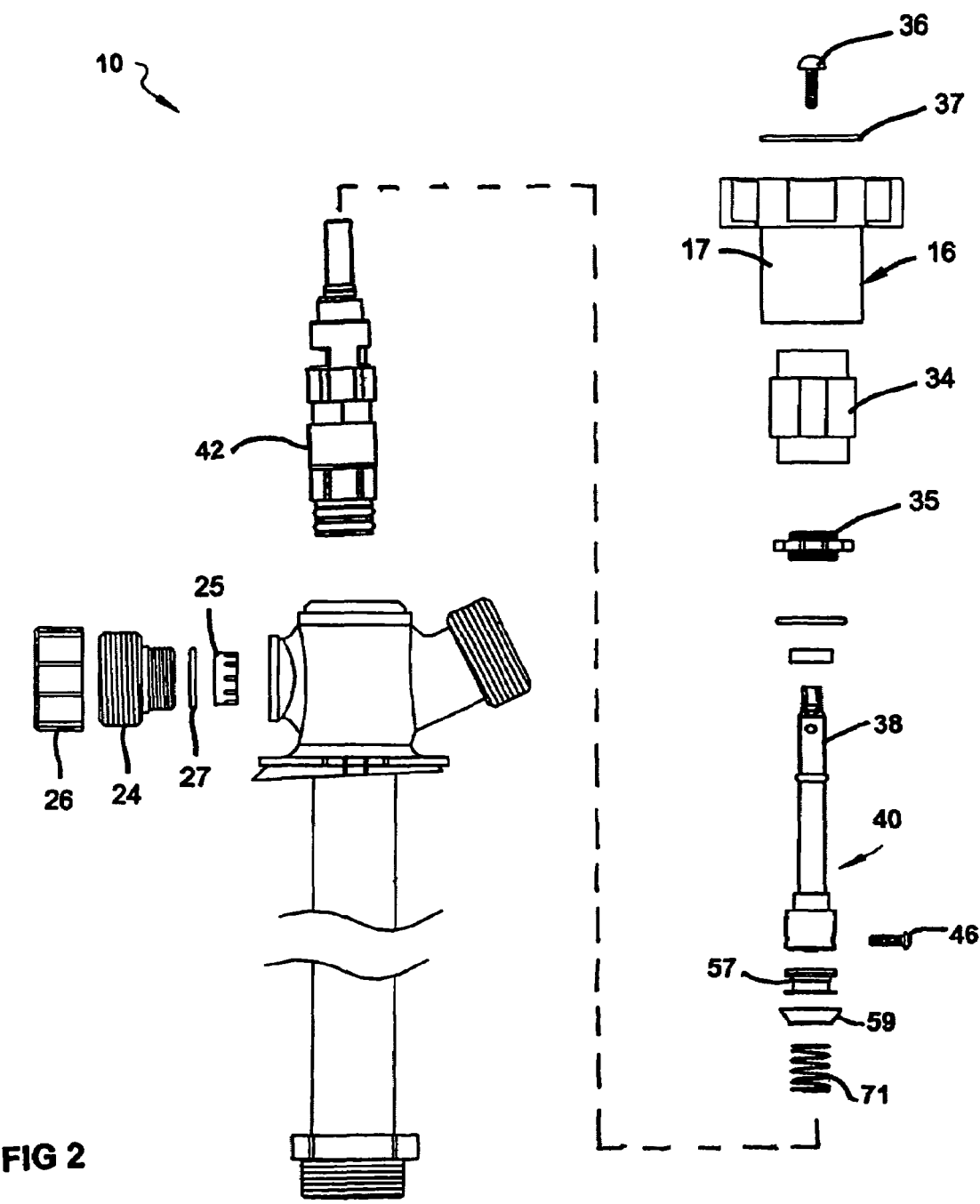
FIG. 2 is an exploded elevational view of the ¼ turn frost free faucet assembly shown in FIG. 1.

The handle assembly 16 may be any type of handle known in the art. It may be formed from metal, plastic, or any other material that is durable and is suitably strong to enable longevity in use of the frost free faucet assembly 10. As can be seen in FIG. 2, the handle assembly 16 is connected to a stem assembly 40. A fastener 36 such as a screw, rivet, or the like is used to secure a name plate 37 and a handle 17 to the packing nut 34. The packing nut 34 secures the valve cartridge assembly 42 and the stem assembly 40 inside the spigot assembly 12 and sleeve 14 and prevents water from leaking from the handle assembly 16 by way of a packing 35 that is formed of rubber, plastic, or other suitable sealing material. The packing nut 34 is a cylindrical piece and is hollow so as to receive an actuation portion 38 of a valve stem 40.

The valve stem 40 is located within the frost free faucet assembly 10, and more particularly, within the sleeve assembly 14 and spigot assembly 12. As the handle assembly 16 is connected to the stem 40, when the handle 17 is turned to an "on" or "off" position, an actuation portion 38 of the valve stem 40, and thus the entire valve stem 40, is also turned within the sleeve assembly 14 to actuate the valve cartridge assembly 42. The valve stem 40, in addition to the actuation portion 38, further includes a valve connection portion 44 that is used to connect the valve stem 40 to the valve cartridge assembly 42. The valve cartridge assembly 42 is secured to the valve connection portion 44 of the valve stem 40 by way of a slider plate 57, u-packing 59 and a fastener 46 such as a screw, rivet, or the like. The valve stem 40 and the valve assembly 42 fit within the sleeve assembly 14.

Figure 3B:
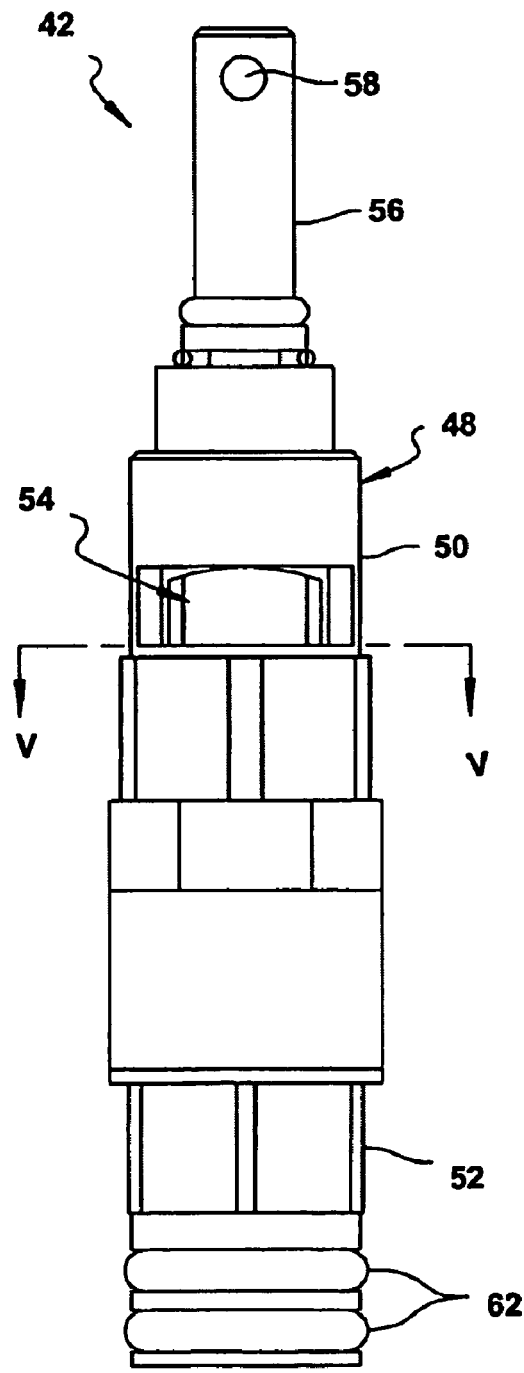
FIG. 3A and FIG. 3B are elevational views of a ¼ turn valve cartridge assembly for use in the frost free faucet assembly.
Figure 3A:
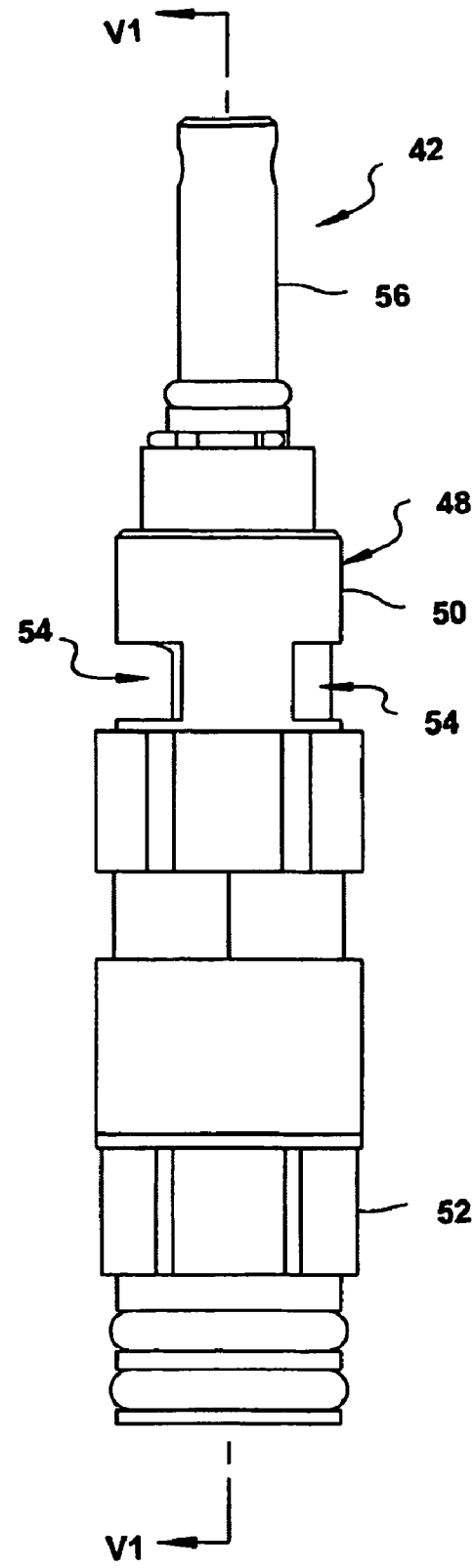
Figure 4:
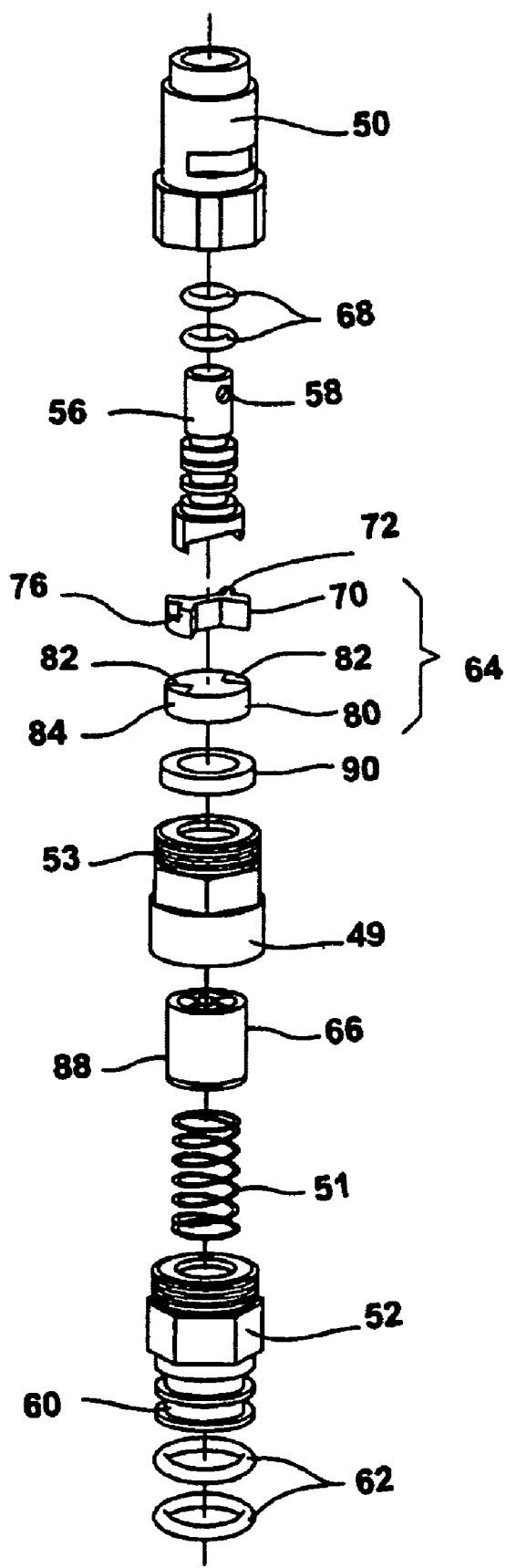
FIG. 4 is an exploded perspective view of the ¼ turn valve cartridge assembly for use in the frost free faucet assembly shown in FIGS. 3A and 3B.

Now referring to FIGS. 3A, 3B, and 4, the valve cartridge assembly 42 will be described. As can be seen in FIGS. 3A and 3B, the valve cartridge assembly 42 includes a housing 48 that includes a valve shell 50 and a valve seat 52. The valve shell 50 is a cylindrical, hollow member that includes radial outlet ports 54. Preferably, the valve shell 50 is comprised of brass or any other material that will not degrade during the lifetime of the frost free faucet assembly 10. More preferably, the valve shell 50 is formed of a material that will not chemically react with any elements that may be present in the water or fluid for which the valve conducts. The outlet ports 54 allow the water or any other fluid for which the valve is used to exit the valve housing 48 and travel downstream towards the spigot assembly 12. Also included in the housing 48 is an armature 56 that fits and is rotatably supported within the valve shell 50. The armature 56 is essentially an extension of the valve stem 40 that extends into the cartridge 48. The armature 56 is preferably formed of brass and includes a hole 58 for accepting the fastener 46, such as screw, rivet, or the like for securing the valve assembly 42 to the valve connection portion 44 of the valve stem 40.

The valve seat 52 is engaged with the valve shell 50, and is a hollow, cylindrical shaped member. The valve seat 52 is also preferably formed of brass. As with the valve shell 50, the valve seat 52 is also preferably formed of any other suitable material that will not degrade during the lifetime of the frost free faucet assembly 10 or chemically react with elements in the water or fluid. The valve seat 52 includes a threaded portion 60 (FIG. 4) used to releasably secure the valve seat 52 with the valve shell 50. The valve seat 52 also preferably includes a pair of o-rings 62. Although two o-rings 62 are shown in FIGS. 3A and 3B., it should be understood that two o-rings 62 are not required for the operation of the present invention. One o-ring 62 may be provided to further preventing any leaks from developing in the frost free faucet assembly 10.

Now referring to FIG. 4, the components of the valve cartridge assembly 42 contained within the valve shell and valve seat 50 and 52 will now be described. The valve cartridge assembly 42, in addition to the valve shell 50, valve seat 52, and armature 56 includes a valve member 64 and a check valve 66. The valve member 64 is disposed upstream and engaged with the armature 56 within the valve shell 50. Another pair of o-rings 68 provide a seal between the armature 56 and the valve shell 50. Although two o-rings 68 are shown a single o-ring 68 is sufficient to provide an effective seal between the armature 56 and the valve shell 50.

The valve member 64 is a ¼ turn valve member having two valve elements 70 and 80. A rotatable element 70 is preferably a butterfly-shaped disc defined by two flanges 72 having recesses 74 formed therein. One skilled in the art, however, will recognize that the shape of rotatable element 70 may vary such as an element shape similar to stationary disc 80 or otherwise. The rotatable element or disc 70 further includes inlets 76 disposed adjacent the flanges 72. The recesses 74 of the rotatable element 70 engage with a pair of prongs 78 of the armature 56. The second element 80 of the valve member 64, is a stationary disc 80 having two through-holes 82. The stationary disc 80 includes a pair of bar members 84 that extend outward from the circumference of the stationary disc 80 and engage with indentations (not shown) located on an interior surface of the shell member 50. The bar members 84 engage the valve shell 50 to prevent rotation therein. The through-holes 82 of the stationary disc 80 coordinate with the inlets 76 of the rotatable disc 70 when the valve stem 40, armature 56, and thus the rotatable disc 70, are turned 90° relative to the stationary disc 80. The rotatable disc 70 is prevented from turning greater than 90° by stops 86 (FIGS. 5A and 5B) that are formed on the interior surface of the valve shell 50. More particularly, the stops 86 prevent the prongs 78 of armature 56 from turning greater than 90° within the valve shell 50.

The discs 70, 80 of the valve member 64 are preferably fabricated of a ceramic material. The use of a ceramic material is advantageous in that it is a relatively inert and strong material. As such, the discs 70 and 80 will not degrade over time due to elements that may be contained in the water or fluid that travels through the valve assembly 42. Furthermore, the ceramic material is scratch-resistant and prevents the discs from becoming damaged throughout the life of the frost free faucet 10. Although it is preferable to use a ceramic material in the present invention, it should be understood that the present invention contemplates the use of other materials.

For example, the discs can be formed of a high-strength polymer, brass, stainless steel, or any other suitable material.

The valve cartridge assembly 42 includes a check valve 66 formed, for example from a polymeric material or plastic such as polypropylene, polystyrene, or polyethylene and is disposed upstream of the valve member 64 (i.e., between the water source 8 and the valve member 64) within the valve seat 52 of the valve cartridge assembly 42. Alternatively, the check valve 66 can be disposed within a check valve seat 49 that is disposed between the valve shell 50 and valve seat 52 (See FIG. 7). In this alternative embodiment, the check valve seat 49 is another cylindrical member that is formed of the same material (e.g., brass) as the valve shell 50 and valve seat 52. To connect the check valve seat 49 to the valve shell 50 and valve seat 52, the check valve seat 49 preferably includes a pair of threaded portions 53 and 55 that engage with the threaded portions of the valve shell 50 and valve seat 52. Otherwise, the check valve seat 49 can be connected to the valve seat 52 by welding, brazing, or the like. It should be understood that when utilizing a check valve seat 49, it may be desirable to include a spring 51 in the valve seat 52. This spring 51 supports the check valve 66 in the check valve seat 49, and prevents the check valve 66 from moving into the valve seat 52 when backpressure develops within the frost free faucet 10.

The check valve 66 includes a cylindrical member 88 (FIG. 6A) and is separated from the valve member 64 by a washer 90 that is preferably formed from silicone or rubber. The check valve 66 further includes a spring 92 and a plunger 94 (shown in FIGS. 6A and 6B) that are actuated by the flow of water. An o-ring 95 surrounds the plunger 94 to prevent leaks when the plunger 94 and frost free faucet 10 are in a closed position. The check valve 66 is utilized for anti-siphoning and discharging backpressure. In preventing siphoning, the check valve 66 prevents water from flowing back through the valve cartridge assembly 42 and re-entering the water supply of the inlet pipe located within the building when a negative pressure differential exists across the plunger 94. As such, it is beneficial that the check valve 66 be placed upstream of the valve member 64.

Figure 5A:
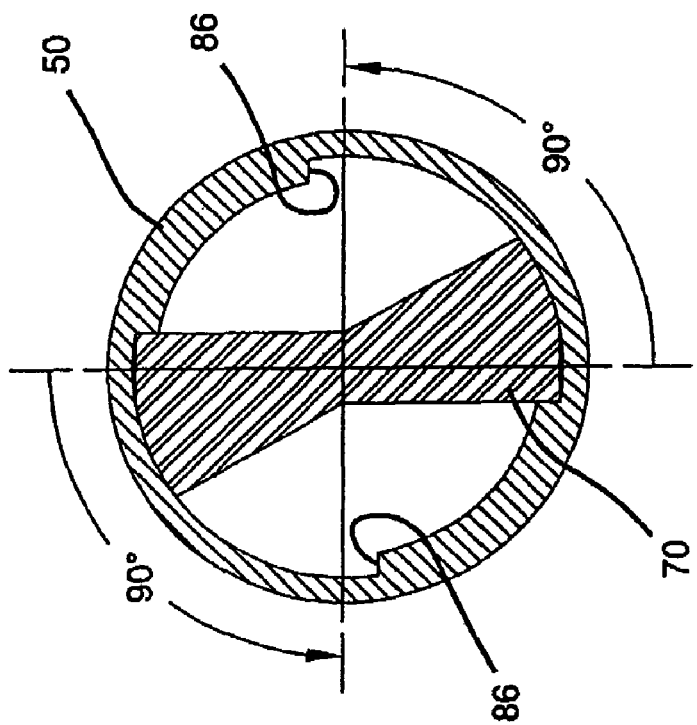
FIG. 5A and FIG. 5B are cross-sectional views along line V-V shown of FIG. 3B illustrating the operation of the ¼ turn valve cartridge assembly.
Figure 5B:
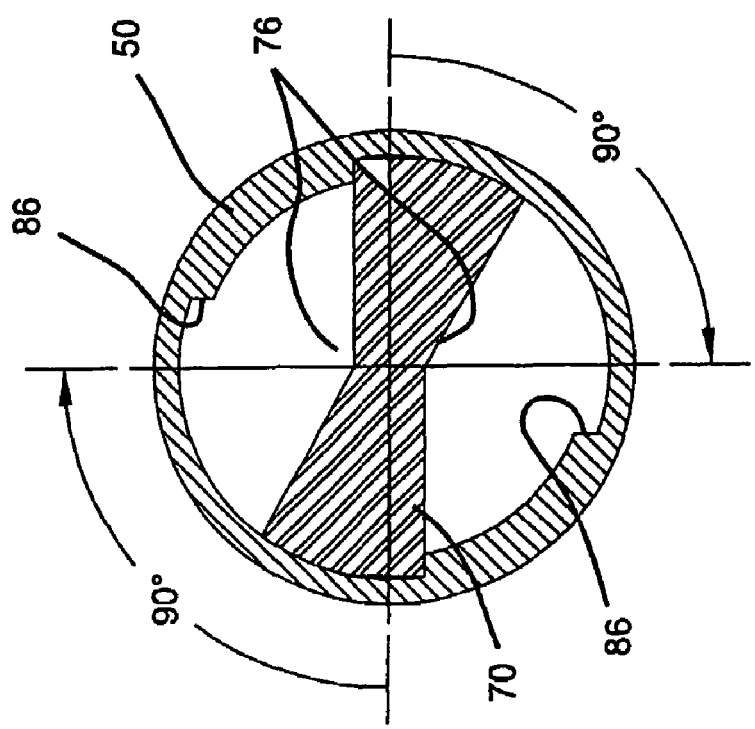

Operation of the frost-free faucet assembly 10 according to the present invention will now be described. In order to open the frost free faucet valve assembly 10, the handle 17 (FIG. 2) is turned in a first direction. As the valve member 64 is a ¼ valve, the handle 17 only undergoes a 90° of rotation to turn the valve member 64 to an open position. The handle 17 actuates the valve stem 40 and armature 56 to rotate the rotatable disc 70 of the valve member 64 a ¼ turn or 90°. This ¼ turn operation of the valve member 64 is shown in FIGS. 5A and 5B. When the rotatable disc 70 is rotated 90°, the inlets 76 of the rotatable disc 70 align with the through-holes 82 of the stationary disc 80 and allow water to flow through.

Figure 6A:
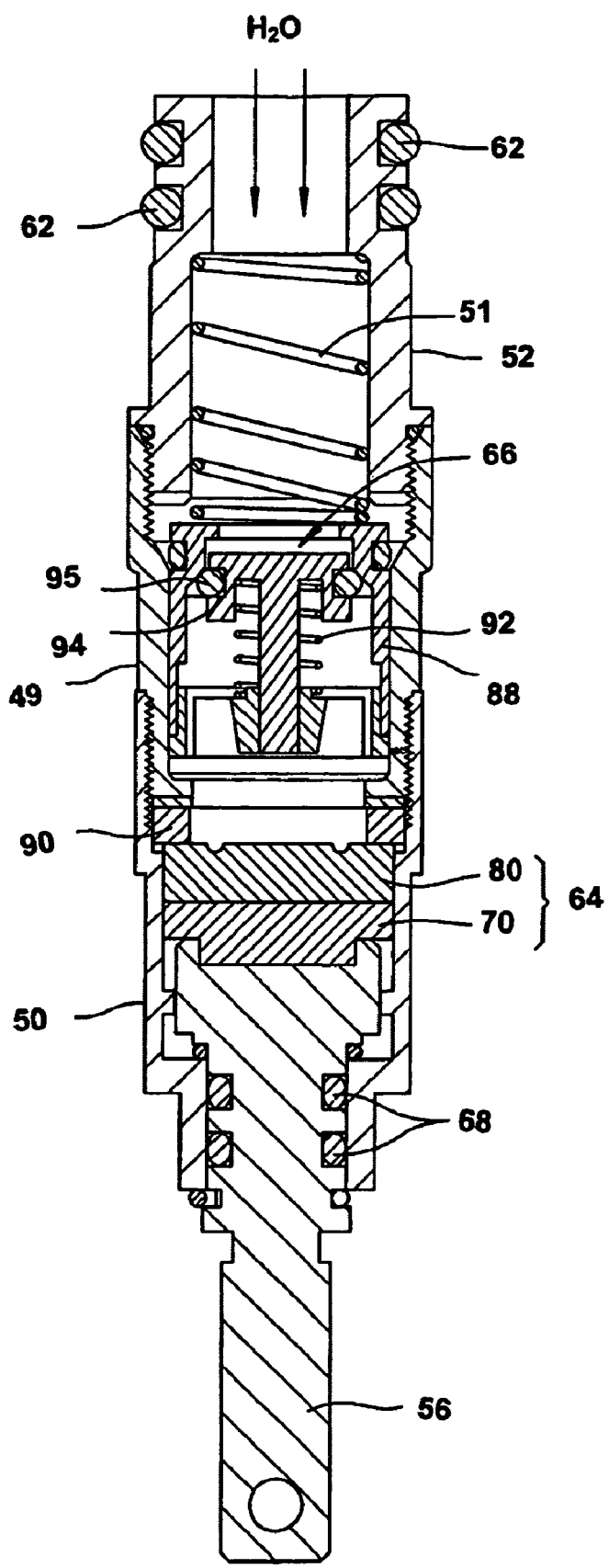
FIGS. 6A and 6B are a cross-sectional views of the ¼ turn valve cartridge assembly, taken through line VI-VI of FIG. 3A.

When the inlets 76 of the rotatable disc 70 are aligned with the through-holes 82, a positive pressure differential exists across the plunger 94. This positive pressure differential compresses the spring toward the cylindrical member 88 and actuates the plunger 94 to an open position (FIG. 6A). When the plunger 94 is in an open position the pressurized water from a water source 8 such as an inlet pipe located within the building is allowed to travel towards and through the check valve 66. The check valve 66 is preferably designed to accommodate water pressure of 120 psi or less, for use in residential or commercial applications. It should be understood, however, that the valve design of the present invention may be modified so that higher water pressures may be accommodated. More particularly, the components of the cartridge 48, valve member 64, and check valve 66 can be enlarged or strengthened to accommodate higher pressures.

The pressurized water travels through the open check valve 66 towards the ¼ turn valve member 64. The water flows through the aligned through-holes 82 and inlets 76 of the disc 70 and enters into the shell member 50 of the cartridge 48. The water then exits the shell member 50 of the cartridge 48 through the outlet ports 54 and enters the sleeve assembly 14. The water then flows around the valve stem 40 and through the sleeve member 14 downstream towards the spigot assembly 12 and exits from the drain conduit 20.

Figure 6B:
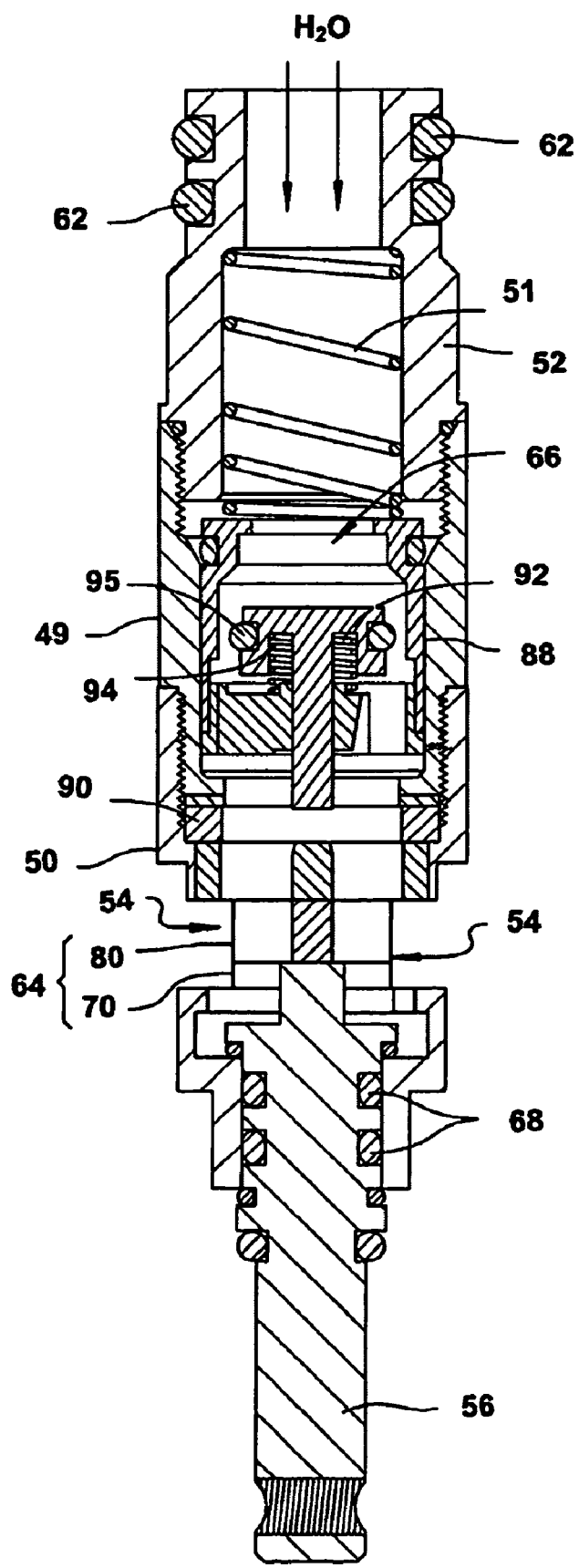
Figure 7:
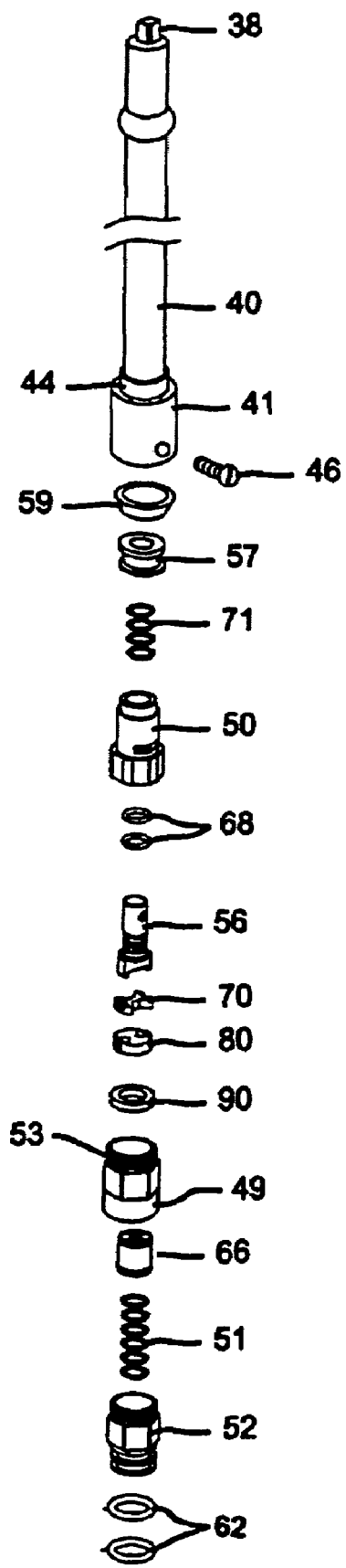
FIG. 7 is an exploded perspective view of a portion of the ¼ turn valve assembly, which includes the valve cartridge assembly and the stem assembly.

In order to close the valve assembly 42, and turn the frost free faucet 10 off, the handle 17 is turned a ¼ turn in a second and opposite direction. The handle 17 again actuates the valve stem 40 and armature 56 to rotate the rotatable disc 70 90° to a closed position. FIG. 6A illustrates a closed position of the ¼ turn valve 10 while FIG. 6B illustrates an open position. Referring to FIG. 6B, it can be seen that the inlets 76 of the rotatable disc 70 and the through-holes 82 of the stationary disc 80 become misaligned and prevent water from flowing through the ¼ turn valve 64. A backpressure or negative pressure differential then exists between the valve assembly 42 and the water source 8 (FIG. 1). This negative pressure differential allows the spring 92 to decompress which causes the plunger 94 of check valve 66 to "check" into a closed position and prevents the water still downstream of the valve cartridge 48 from siphoning back into the inlet pipe.

Figure 8:
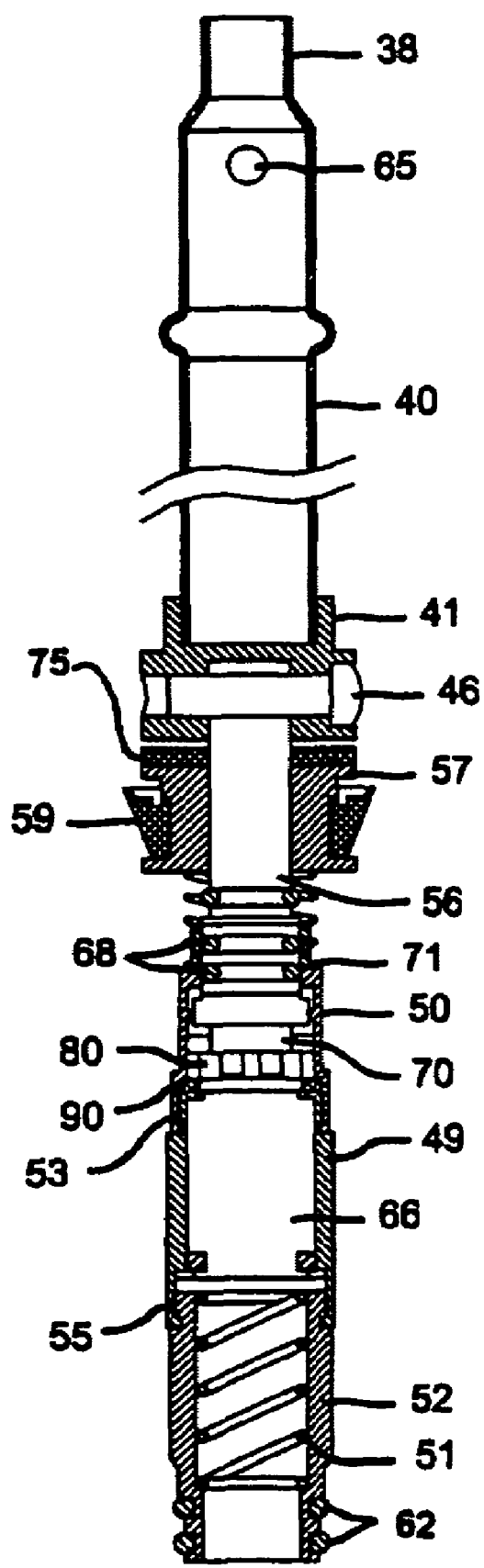
FIG. 8 is a cross-sectional view of the ¼ turn valve assembly shown in FIG. 7.
Figure 9:
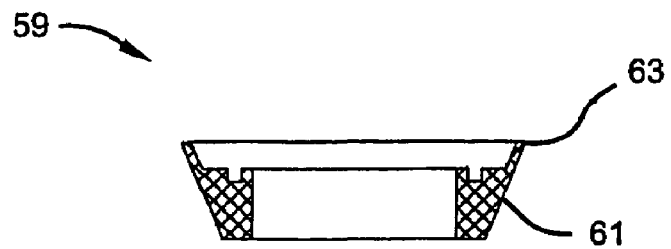
FIG. 9 is a cross sectional view of a U-packing for the ¼ turn valve assembly.

In the present invention, shown in FIGS. 7-11, the valve stem 40 is in the form of a hollow tube with a connector 41 being formed at the valve connection portion 44 thereof. The connector 41 is formed of the same material as the valve stem 40 (e.g., brass) and is cylindrical in shape. Upstream of the connector 41 is a slider plate 57 including a U-packing 59. The slider plate 57 is slidably supported on the armature 56 for axial movement for sealing the conduit 65 formed through connector 41 as described below. The slider plate 57 is preferably formed of plastic or rubber. As shown in FIG. 9, the U-packing 59 is a cone or crown-shaped collar having a single sidewall 61 tapering or extending diagonally outwardly in a downstream direction. Preferably, the U-packing 59 is formed of rubber or is polymeric. The diameter of the U-packing 59 is preferably less than the diameter of the pipe of the sleeve assembly 14 such that a slight clearance exists between the edges 63 of the sidewalls 61 and an inner diameter of the pipe.

When the valve cartridge assembly 42 is in an open position (FIG. 6B), water exits the radial outlet ports 54 of the valve shell 50 and travels downstream towards the spigot 12. As the water travels downstream, the water contacts the U-packing 59 (FIG. 8) and displaces the U-packing 59 and slider plate 57 towards the connector 41. Once the slider plate 57 abuts the connector 41, the momentum of the water deflects the sidewalls 61 (FIG. 9) of the U-packing 59 radially inward so that the water flows towards the valve stem 40 (FIG. 8). This allows the water to continue around the U-packing 59 downstream towards the spigot 12. Due to the U-packing 59, however, the flow of water around the U-packing 59 is slightly restricted and thus smoothed out, thereby reducing the amount of noise emitted by the frost-free faucet 10 in its open position. In this regard, it should be understood that the U-packing 59 does not need to be disposed on the slider plate 57, but may be disposed at any point downstream of the radial outlet ports 54 of the valve shell 50. More particularly, the U-packing 59 may be formed on a portion of the valve shell 50, the armature 56, or the valve stem 40 and still exhibit the function of smoothing out the flow of water to reduce the amount of noise generated during operation of the frost-free faucet 10.

The use of the slider plate 57 and U-packing 59 also assists in the relief of pressure downstream of the valve assembly 42. More particularly, during use of the frost-free faucet 10, it is common for a user to connect a hose with a nozzle to the spigot 12 to control the flow of water through the hose. As such, when both the valve assembly 42 and the nozzle is in a closed position, a pressure is created downstream of the valve assembly 42 (i.e. backpressure) that can stress the elements of the valve assembly 42 and frost-free faucet 10. Although the elements of the frost-free faucet 10 are designed to be resistant to typical levels of this backpressure, a problem can develop when the hose becomes crimped, is stepped on, driven over, etc. Specifically, this can result in an excessive amount of backpressure developing that may damage the elements of the valve assembly 42 or frost-free faucet 10.

Thus, the slider plate 57 functions to provide a pressure relief function. Specifically, when the backpressure is great enough, the U-packing 59 and slider plate 57 slide upstream back towards the armature 56. This relative sliding movement moves a seal 75 carried by the slider plate 57 to expose a conduit 63 formed through the connector 41. One skilled in the art will recognize that the U-packing 59 should not seal the conduit 65 on the stem assembly 40 to allow water situated between the slider plate 57 and the valve assembly to be displaced as the slider plate 57 moves upstream.

Figures 10A, 10B:
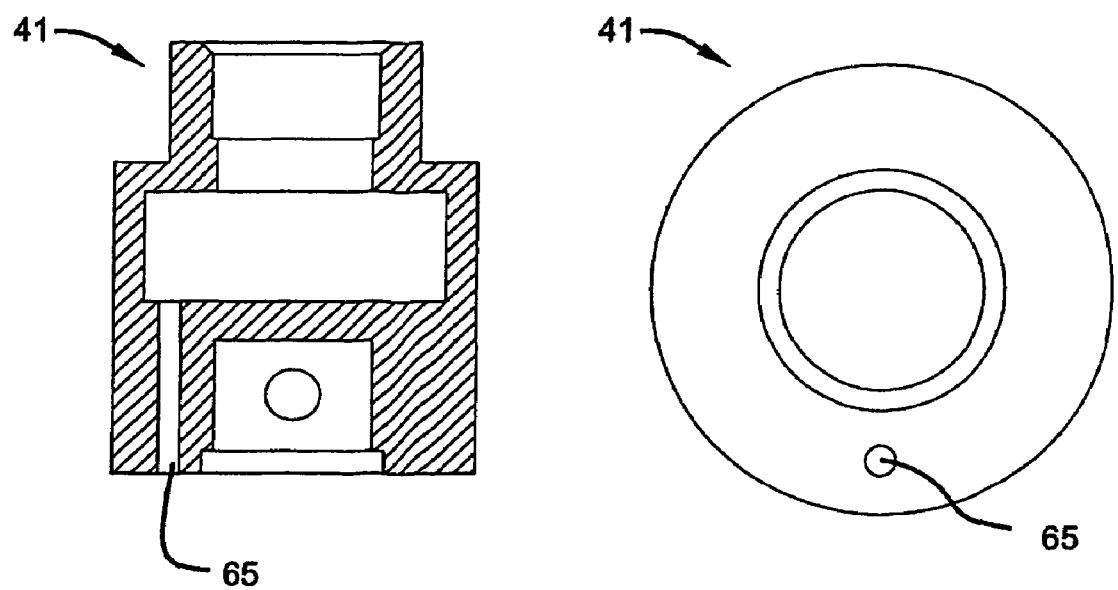
FIGS. 10A and 10B are a cross-sectional and bottom view, respectively, of a connector for use with the ¼ turn valve assembly.
Figure 11:
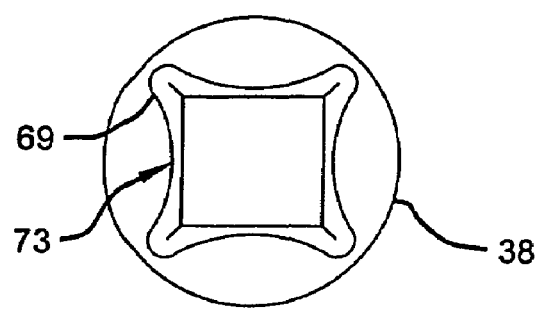
FIG. 11 is a top view of a valve stem for use with the ¼ turn valve assembly.

Referring to FIGS. 10A and 10B, it can be seen that the connector 41 includes a conduit 65 that is in fluid connection with the hollow valve stem 40. As the conduit 65 is exposed when the slider plate 57 is displaced upstream, a drain passageway is established from the downstream position 30 of the sleeve assembly 14 through the connector 41 via the conduit 65 and through the hollow valve stem 40. Water may either exit through the conduit 65 of the valve stem 40 that is located within the handle 17, or may continue downstream through the valve stem 40 and exit through an opening in the handle 17 wherein the handle 17 is connected to the valve stem 40 by the fastener 36. In this regard, the water may exit through the handle 17 because the actuation portion 38 of the valve stem 40 that is connected to the handle 17 has a non-circular square (or star shape 73) (See FIG. 11). Due to the non-circular shape 73 of the actuation portion 38 of the valve stem 40, however, water may travel through the lobes 69 around the fastener 36, and out of the handle 17. As such, backpressure that may develop in the frost free faucet 10 may be relieved by the leakage of the water through the handle 17.

A spring 71 may be provided between the slider plate 57 and the valve shell 50. In this manner, the slider plate 57 may only be displaced upstream by the backpressure of the water in the event that the force generated by pressure acting on the slider plate 57 and U-packing 59 is greater than the biasing force of the spring 71. In this regard, it is preferable that the spring 71 has a spring constant in the range of 0.025 to 0.075 N/mm, and most preferably about 0.05 N/mm. However, one skilled in the art will recognize that the spring rate may vary in accordance with the geometry of the slider plate 57. By including the spring 71 between the slider plate 57 and armature 56, the conduit 65 in the connector 41 will only be exposed in the event of extreme backpressure that may damage the frost free faucet 10.

½ Turn Valve

Figure 12:
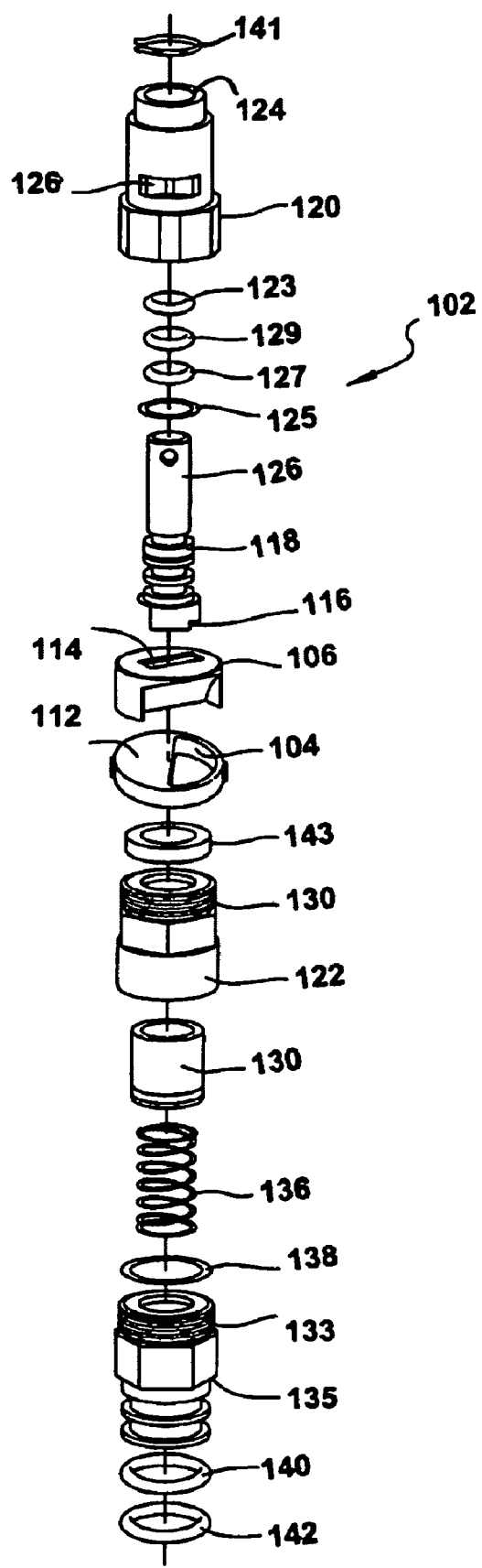
FIG. 12 is an exploded perspective view of a ½ turn valve cartridge assembly in accordance with the present invention.
Figure 14:
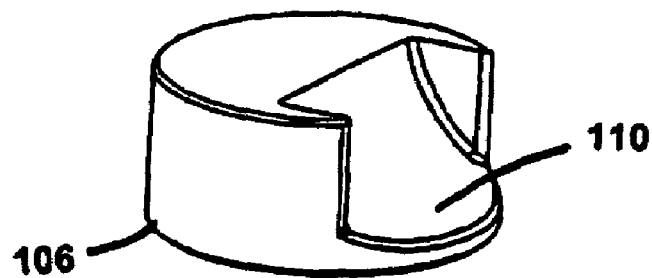
FIG. 14 is an isometric view of a ½ turn rotatable valve element, illustrated in FIG. 12, shown inverted, in accordance with the present invention.
Figure 15:
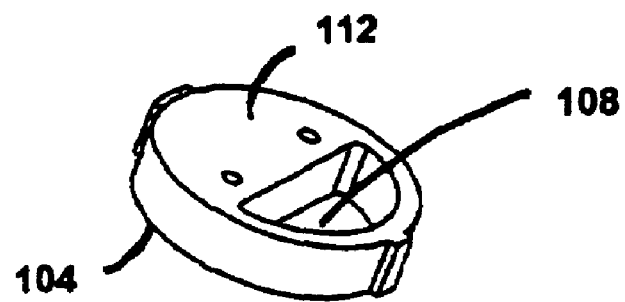
FIG. 15 is an isometric view of a ½ turn stationary valve element, illustrated in FIG. 12, in accordance with the present invention.
Figure 16:
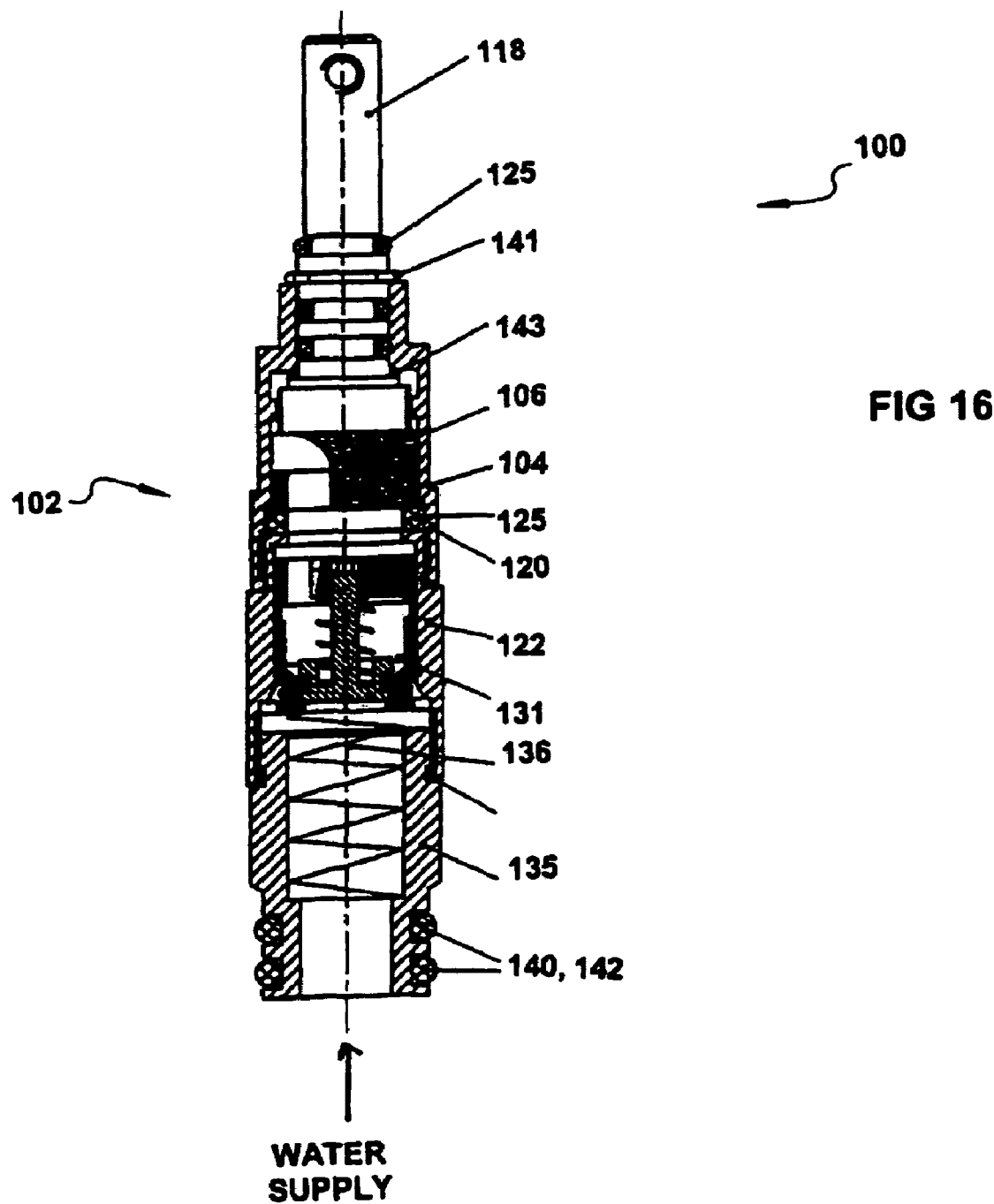
FIG. 16 is a sectional view of a ½ turn valve in accordance with the present invention.

A ½ turn frost free valve assembly is illustrated in FIGS. 12-16 and generally identified with the reference numeral 100. The half-turn valve assembly 100 is similar to the ¼ turn frost free valve assembly 10 illustrated in FIGS. 1-11 in virtually all respects except for the configuration of the valve elements, utilized in the valve cartridge assembly. FIG. 12 illustrates an exploded perspective view of a valve cartridge assembly for the ½ turn valve in accordance with the present invention and is generally identified with the reference numeral 102. FIG. 16 illustrates the valve cartridge assembly 102, fully assembled. The balance of the components of the valve are as illustrated and discussed in detail above in connection with the ¼ turn valve assembly. As will be discussed in more detail below, the principles of the present invention are applicable to virtually any valve that is rotatable up to 180°, the only difference being the configuration of the through hole and water passageways in the stationary and rotatable valve elements in the valve cartridge assembly 102.

Referring to FIG. 12, the valve cartridge assembly 102 includes a stationary valve element 104 and a rotatable valve element 106. The rotatable valve element 106 is shown in more detail in FIG. 14, while the stationary valve element 104 is shown in more detail in FIG. 15. As shown in FIGS. 12, 14, and 15, the rotatable valve element 106 is disposed on top and rotates relative to the stationary valve element 104 to either allow water to pass through the valve elements 104 and 106 or to block water passage.

As shown in FIGS. 12 and 15, the stationary valve element 104 includes one or more through-holes 108 formed in a semi-circular portion of the stationary valve element 104. FIG. 14 illustrates a rotatable valve element 106, shown inverted. As shown, the rotatable valve element 106 is formed as a generally circular or cylindrical member with an arcuate recess ramp portion 110 which forms a water passageway. The water passageway 110 is similarly formed in a semi-circular portion of the rotatable valve element 106. As such, upon turning the rotatable valve element 106 180° in a first direction, the water passageway 110 will be aligned with the one or more through-holes 108, thereby defining an open position for the valve and allowing water to pass through the two valve elements 104, 106. Conversely, rotating the rotatable valve element 106 in an opposite direction will cause the water passageway 110 to be closed by way of a solid portion 112 of the stationary valve element 104, thereby preventing water flow through the valve elements 104, 106.

It should be understood that other embodiments between a quarter-turn and a half-turn valve are contemplated. In those other embodiments, the stationary valve element 104 is configured with the through holes in less than a semi-circular portion of the stationary valve element 104 and the water passageway is similarly formed in less than a semi-circular portion of the valve element 106. For example, for a ⅓ turn or other valve, the stationary valve element 104 may be configured with a through-hole which covers one-third or 120° of the disc-shaped stationary valve element 104. The rotatable valve element is similarly configured so that its water passageway is aligned with the through-hole in the stationary valve element in a first position and blocked in a closed position, wherein the difference between the open position and closed position is, for example, one-third turn. Virtually an infinite number of embodiments can be implemented by varying the configuration of the stationary valve element 104 and the rotatable valve element 106.

Referring to FIG. 12, the rotatable valve element 106 and the stationary valve element 104 form part of the valve cartridge assembly 102. In particular, the rotatable valve element 106 is disposed on top of the stationary valve element 104 and configured to rotate. The rotatable valve element 106 further includes a slot 114 for receiving an extending tongue 116 of a valve stem 118. As discussed above, the valve stem 118 is attached to a handle (not shown). Thus, when the handle is rotated, the valve stem 118 and rotatable valve element 106 will rotate therewith.

The rotating valve element 106 and stationary valve element 104 as well as the valve stem 118 are housed by a housing formed from an upper housing 120 and a lower housing 122. The upper housing 120 is formed with a through-hole 124 for receiving an extending shaft 126 of the valve stem 118. The upper housing 120 also includes a radially-disposed water passageway 126, similar to the passageway for the ¼ turn valve cartridge illustrated and described above. As shown in FIG. 16, an interior portion 121 of the upper housing 120 is threaded to enable it to be secured to a threaded portion 130 of the lower housing 122. A rubber washer 143 is used to seal the lower housing 122 relative to the upper housing. A plurality of o-rings 123, 127, and 129 seal the valve stem 118 relative to the upper housing 120. A clip 141 secures the valve stem 118 to the upper housing 120.

The lower housing 122 also forms a valve seat for a check valve 130. As shown best in FIG. 16, the lower housing 122 also includes a threaded portion 137 that is adapted to be secured to a threaded portion 133 (FIG. 12) of a cartridge seat 135. A check valve assembly 131 and a spring 136 are captured within the lower housing 122 and the cartridge seat 135. An o-ring 138 is used to seal the lower housing assembly 122 to the cartridge seat 135.

Figure 13:
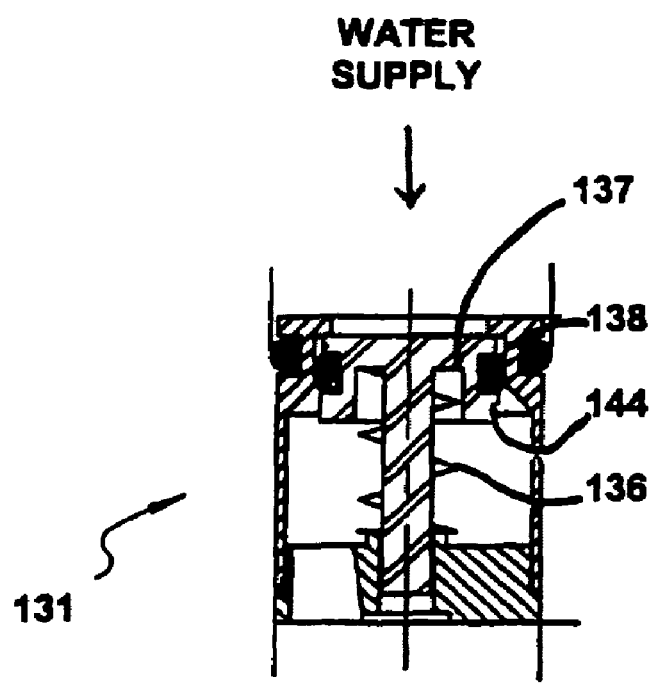
FIG. 13 is a sectional view of a check valve for use in the ½ turn frost free faucet assembly shown, for example, in FIG. 16.

The check valve assembly 131 is shown in detail in FIG. 13. As shown, the check valve assembly 131 includes a plunger 137 and a biasing spring 139. The direction of water flow from the source is shown by the arrow 150. In a condition when the valve is turned on, the water pressure from the source pushes the plunger 137 away from its seat to allow water to flow, thereby compressing the spring 139. When the valve 100 is turned to an off position, the pressure across the plunger 137 is equal, thereby allowing the compressed biasing spring 139 to bias the plunger 137 to a closed or seated position as shown in FIG. 13. As such, the check valve assembly 131 protects the water supply from contamination from an external source.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve cartridge assembly comprising:
   a housing having an inlet and an outlet;
   a valve member located within said valve housing and rotatably positionable through at least 180 degrees between a closed position and an open position to selectively enable fluid communication from said inlet to said outlet, said valve member including a first valve element and a second valve element located downstream and rotatably positionable with respect to said first valve element, said first valve element having a first passageway formed therein which aligns with an axially arcuate recess formed in said second valve element when said valve member is in said open position, said second valve element blocking said first passageway when said valve member is in said closed position.

2. A frost-free faucet comprising:
   a spigot disposed at a first end of an elongated pipe;
   a valve assembly disposed at a second end of said elongated pipe, said valve assembly including a valve member located within a housing and rotatably positionable through at least 180 degrees between a closed position and an open position to selectively enable fluid communication form an inlet to an outlet, said valve member including a first valve element and a second valve element located downstream and rotatably positionable with respect to said first valve element, said first valve element having a first passageway formed therein which aligns with a second passageway formed in said second valve element when said valve member is in said open position, said second valve element blocking said first passageway when said valve member is in said closed position, and a check valve located in said housing between an inlet of said housing and said valve member to selectively disable fluid communication from said inlet to said valve member;
   a valve stem extending from said first end to said valve member such that said valve member is rotatably positionable by said valve stem; and
   a slider plate including a collar with flexible sidewalls disposed on said valve stem, said slider plate being slidably positionable on said valve stem when said valve member is positioned between said closed and said open position.

3. The assembly of claim 1, further comprising a check valve located in said housing between said inlet and said valve member to selectively disable fluid communication from said outlet to said inlet.

4. The assembly of claim 1, wherein said first valve element includes a first disc fixed within said valve housing and said second valve element includes a second disc rotatably positionable relative to said first disc within said valve housing.

5. The assembly of claim 1, wherein said first passageway is defined by a semicircular-shaped hole in said first valve element.

6. The assembly of claim 1, further comprising an armature and a connector disposed on said armature, said connector including a drainage conduit.

7. The frost-free faucet of claim 2, wherein said first valve element includes a first disc fixed within said valve housing and said second valve element includes a second disc rotatably positionable relative to said first disc within said valve housing.

8. The frost-free faucet of claim 2, wherein said first passageway is defined by a semicircular-shaped hole in said first valve element.

9. The frost-free faucet of claim 2, wherein said second passageway is defined by an axially formed arcuate recess in said second valve element.

10. The frost-free faucet of claim 2, further comprising a connector disposed on said valve stem, said connector including a drainage conduit.

11. A valve comprising:
   a housing having an inlet and an outlet;
   a valve member disposed within said housing between said inlet and said outlet, said valve member including a first valve element and a second valve element, said second valve element located downstream from said first valve element and being rotatably positionable relative to said first valve element such that a first passageway formed in said first valve element is alignable with an axially arcuate recess in said second valve element; and
   a check valve disposed between said inlet and said valve member.

12. The valve according to claim 11, wherein said second valve element is rotatably positionable relative to said first valve element by an armature engaged with said second valve element.

13. The valve according to claim 12, further comprising a slider plate including an annular collar that defines flexible sidewalls disposed on said armature, said slider plate being slidably positionable on said armature.

14. The valve according to claim 11, wherein said second valve element is rotatably positionable relative to said first valve element through 180 degrees.

15. A frost-free faucet including the valve of claim 11.

* * * * *

UNITED STATES PATENT AND TRADEMARK OFFICE
CERTIFICATE OF CORRECTION

PATENT NO.         : 7,549,444 B2
APPLICATION NO. : 11/315679
DATED                  : June 23, 2009
INVENTOR(S)        : James Li Page 1 of 1

It is certified that error appears in the above-identified patent and that said Letters Patent is hereby corrected as shown below:

On the Title Page, Item No. (57), Abstract Line 18
  "material," should be -- material. --;

Column 2, Line 18
  After "are" delete "a";

Column 3, Line 48
  "u-packing" should be -- U-packing --;

Column 4, Line 15
  "3B.," should be -- 3B, --;

Column 4, Line 17-18
  "preventing" should be -- prevent --;

Column 8, Line 30
  "recess ramp" should be -- recess or ramp --;

Column 10, Line 1, Claim 2
  "form" should be -- from --;

Signed and Sealed this

Sixth Day of October, 2009

David J. Kappos
*Director of the United States Patent and Trademark Office*